June 11, 1957    J. C. WELLINGTON, JR., ET AL    2,795,748
AUTOMATIC SPEED CONTROL SYSTEM USING VARIABLE TRANSMISSION
Filed July 16, 1952                 2 Sheets-Sheet 1
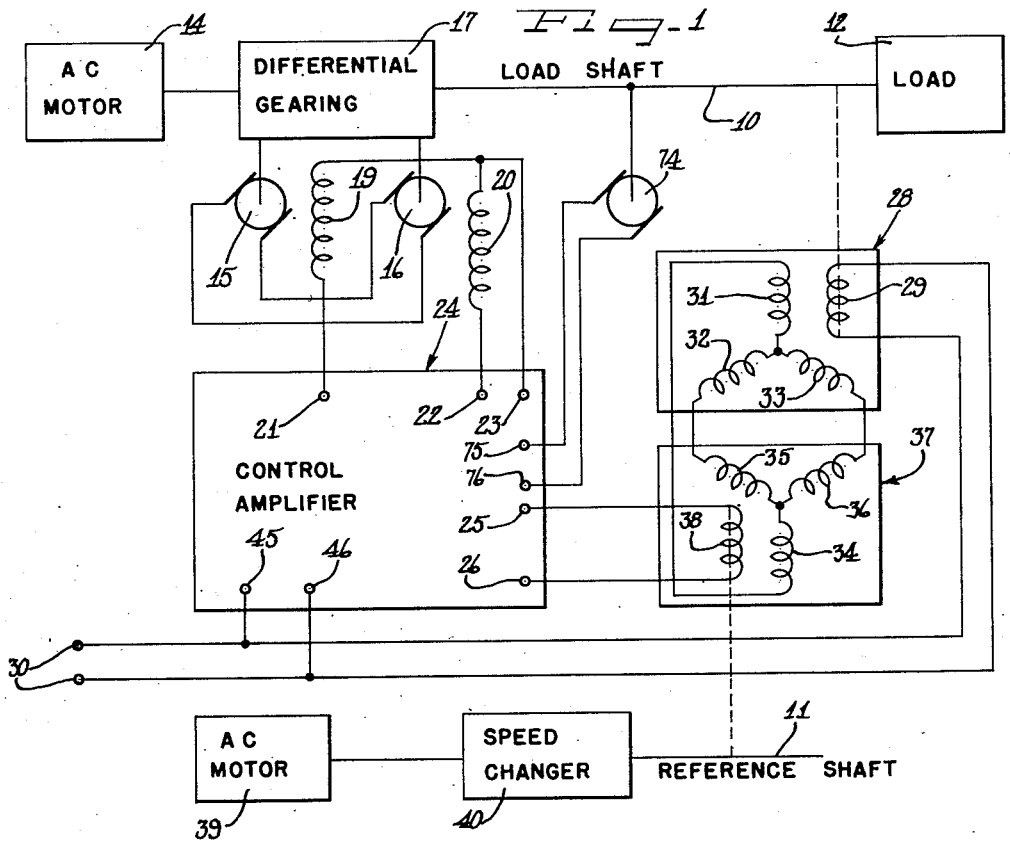
Inventors
Joseph C. Wellington, Jr.
Stephan H. Fairweather
Fred H. Guth

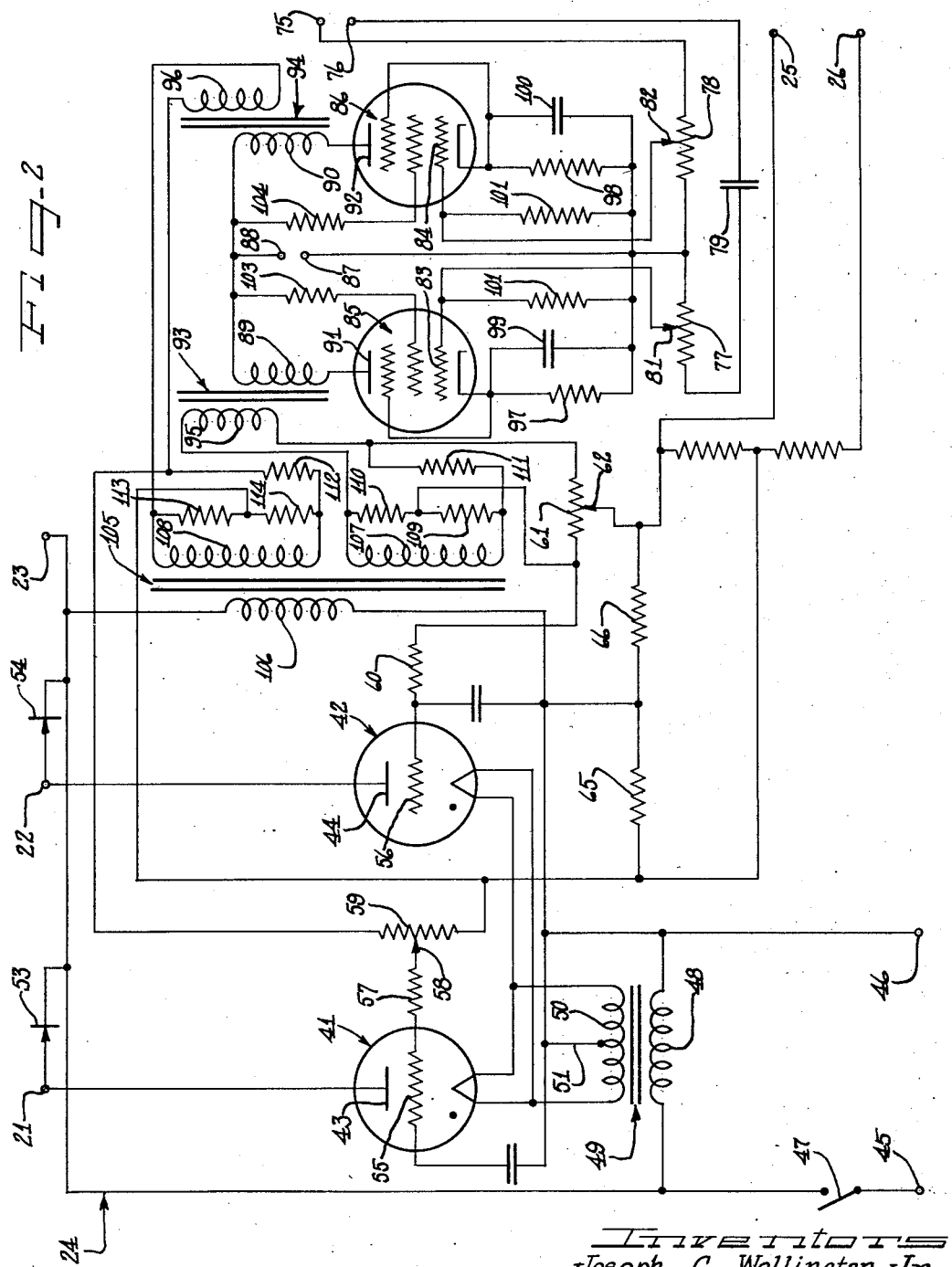

United States Patent Office 2,795,748
Patented June 11, 1957

2,795,748

AUTOMATIC SPEED CONTROL SYSTEM USING VARIABLE TRANSMISSION

Joseph C. Wellington, Jr., Euclid, Stephen H. Fairweather, South Euclid, and Fred H. Guth, Maple Heights, Ohio, assignors to Thompson Products, Inc., Cleveland, Ohio, a corporation of Ohio Application July 16, 1952, Serial No. 299,102

12 Claims. (Cl. 318—13)

This invention relates to stabilization means and more particularly to means arranged to prevent oscillation and to stabilize speed control apparatus.

The stabilization means of this invention has general application but is herein shown and described as used with apparatus for automatically controlling the velocity and phase of rotation of the load shaft in accordance with the velocity and phase of rotation of a reference shaft. In a preferred embodiment, an alternating-current motor and a pair of variable speed direct-current motors are connected through differential gearing to the load shaft. The differential gearing is such that when the direct-current motors are driven at the same speed, the load shaft is driven at a speed which is a fixed ratio of the speed of the alternating-current motor and, by changing the relative speeds of the direct-current motors, the speed of the load shaft is correspondingly changed. Since the motors are all constantly rotating and no start and stop operation is required, an extremely fast response is achieved.

In order to automatically control the speed of the load shaft, an error or correction voltage corresponding to any difference in velocity and phase of rotation of the load shaft relative to the reference shaft is obtained. For this purpose, a synchro generator is herein driven by the load shaft and is electrically connected to a synchro transformer driven by the reference shaft. The synchro transformer has an output corresponding in amplitude and phase to any difference in phase between the load shaft and the reference shaft. This output voltage, or error voltage, is applied to a control amplifier which controls energization of the fields of the two direct-current motors. When the synchro transformer output is of one phase, one motor will be driven at increased speed with the other motor at a decreased speed to increase the speed of the load shaft while, with the opposite phase, the reverse will be true. In this manner, the velocity of rotation of the load shaft is automatically maintained equal to the velocity of the reference shaft and, at any given speed, the relative phase between the two shafts is substantially constant. Hence, this drive maintains the rotational velocity of the load shaft to within very close tolerances equal to the velocity of rotation of the reference shaft.

Although the control amplifier may, of course, take other forms, a preferred construction includes a pair of gas-filled electronic tubes, or thyratrons, used with alternating-current applied to the plates from the same line as the alternating-current applied to the synchro generator. The output of the synchro transformer is applied between the grids of the two tubes so that, with one polarity, one tube will conduct more than the other and with the opposite polarity, the reverse is true. The fields of the two direct-current motors are connected in the plate circuits of the thyratron tubes.

Using apparatus such as thus far described, it was found that the control loop had a tendency to become unstable and oscillatory at a given frequency. The stabilization means of this invention is provided to render the control stable and non-oscillatory. In a preferred arrangement, a small direct-current generator or tachometer is driven by the load shaft and the output thereof is applied across a resistor and a capacitor in series. With a constant velocity of rotation of the load shaft, the voltage output of the tachometer will be constant and will appear entirely across the capacitor with no voltage across the resistor. However, with any change in the velocity of rotation of the load shaft, the output of the generator will be correspondingly changed and a voltage will be developed across the resistor. This voltage is applied between the grids of a pair of control electronic tubes. These tubes have coils in the plate circuit thereof which control the saturation of a pair of saturable reactors. Hence, with any change in the speed of the load shaft and corresponding voltage across the resistor, the saturation and reactance of the saturable reactors will be changed. Reactance coils of the reactors are connected in alternating-current bridge circuits which preferably are balanced when the speed of the load shaft is constant but unbalanced when the saturations are changed due to changes in the speed of the load shaft. The output of the two bridge circuits are applied in the grid circuits of the thyratron tubes. The phase of the voltages is such as to provide a negative feed-back in the control amplifier over an intermediate range of frequencies including the given frequency referred to above so that oscillation of the control apparatus is prevented.

It will be apparent that this stabilization means may be made very rugged and compact and, at the same time, is efficient in operation, easy to adjust and economically manufacturable.

It is an object of this invention, accordingly, to provide improved stabilization means particularly adapted for use with an automatic speed control apparatus.

This invention contemplates other objects, features and advantages which will become more fully apparent from the following detailed description taken in conjunction with the accompanying drawings which illustrate a preferred embodiment and in which:

Figure 1 is a schematic diagram of the speed control apparatus to which the stabilization of this invention is herein applied;

Figure 2 is a circuit diagram of the control amplifier used in the speed control means of Figure 1 and illustrates more in detail the stabilization means of this invention; and Figure 3 is a graph illustrating a response characteristic obtained with and without stabilizing means of this invention.

The stabilization means of this invention has general application but is herein illustrated and described and has particularly and peculiarly advantageous results with speed control apparatus illustrated in Figure 1. In this apparatus, the velocity and phase of rotation of a load shaft 10 is controlled in relation to the velocity and phase of rotation of a reference shaft 11.

The load shaft 10 is connected to a load 12 and is driven by a variable speed drive including an alternating-current motor 14 and a pair of direct-current motors 15 and 16 connected to the load shaft 10 through differential gearing 17. The drive connection through the differential gearing 17 is such that there is a difference in speed between the load shaft 10 and the A.-C. motor 14 corresponding in amplitude and phase to any difference in speed between the motor 15 and the motor 16. For illustration, it will herein be assumed that, with increased speed of the motor 15 relative to the motor 16, the speed of the load shaft 10 will be increased relative to the speed of the motor 14. The differential gearing 17 may, for example, be similar to that shown in Figure 1 of the Trofimov Patent Number 2,384,776, issued September 11, 1945.

The armatures of the motors 15 and 16 are connected in parallel with terminals of the same polarity connected together as indicated in Figure 1. To control the relative speeds of the motors 15 and 16, fields 19 and 20 respectively thereof are connected to output terminals 21, 22 and 23 of a control amplifier 24 which has a pair of input terminals 25 and 26 excited by an error or correction voltage arising from any difference in phase between the load shaft 10 and the reference shaft 11. With an error voltage of one phase, motor 15 will be driven faster than the motor 16 and, with the reverse phase, motor 15 will be driven slower than motor 16 so that the speed of the load shaft 10 with respect to the reference shaft 11 is automatically maintained constant. The error voltage may be obtained in any desired manner, a preferred way being illustrated in Figure 1 in which a synchro generator 28 has a rotor 29 excited from a source of alternating-current applied to terminals 30, the rotor 29 being driven by the load shaft 10 with respect to three equally spaced stator windings 31, 32 and 33 which are connected to similar stator windings 34, 35 and 36, respectively, of a synchro transformer 37. This transformer 37 has a rotor 38 mechanically driven by the reference shaft 11 and electrically connected to the input terminals 25 and 26 of the control amplifier 24. When the reference shaft 11 and load shaft 10 are driven at the same speed and in phase, there will be no error voltage developed in the rotor 38. With any phase difference between the two shafts, an error or correction voltage will be developed across the rotor 38. This error voltage is alternating and of one phase when shaft 10 leads shaft 11 and is 180° out of said one phase when the shaft 10 lags shaft 11. The amplitude, of course, is dependent upon the angle of lead or lag.

It may be here noted that the reference shaft 11 may be any shaft which it is desired to synchronize another shaft with. If desired, the shaft 11 may be driven by an alternating-current motor 39 through an adjustable speed changer 40 as illustrated in Figure 1.

Referring now to the circuit diagram of Figure 2, the control amplifier 24 includes a pair of gas-filled triode electronic tubes or thyratrons 41 and 42 which have plates 43 and 44, respectively, connected to the terminals 21 and 22, respectively, which are, as described above, connected to the fields 19 and 20 of the motors 15 and 16, respectively. Power for the control amplifier 24 is supplied from the terminals 30 to terminals 45 and 46 thereof. This power is single phase alternating-current and is the same as that applied to the rotor 29 of the synchro generator 28. The terminal 45 is connected through a master switch 47 to one side of a primary 48 of a filament transformer 49 with the other side of the primary 48 connected to the terminal 46. The transformer 49 has a secondary 50 connected to the filaments of both tubes 41 and 42 and having a center-tap 51 connected to the line terminal 46. Plate voltage for the tubes 41 and 42 is supplied by connecting the terminal 45 through the switch 47 to the terminal 23 which is, as described, connected to both of the fields 19 and 20, respectively, of the motors 15 and 16. To absorb the energy stored in the fields 19 and 20 during the negative half cycles of alternating voltage applied to the tubes 41 and 42, rectifiers 53 and 54 are connected between the terminals 21 and 22, respectively, and the terminal 23 so as to be across the fields 19 and 20. During negative half cycles of plate voltage, the rectifiers will serve to continue current flow through the fields 19 and 20 hence, allowing a derating of the thyratrons 41 and 42.

The tubes 41 and 42 have control electrodes or grids 55 and 56, respectively, the grid 55 being connected through a resistor 57 to a movable tap 58 of a potentiometer 59 while the grid 56 is connected through a resistor 60 to one side of a potentiometer 61 which has a movable contact 62. The movable contact 62 is connected directly to the input terminal 25 while one side of the potentiometer 59 is connected to the junction between two voltage dividing resistors 63 and 64 connected between the terminals 25 and 26. Balanced resistors 65 and 66 are connected between the one side of the potentiometer 59 and the movable contact 62, the junction therebetween being connected to the line terminal 46 and the filament center-tap 51.

With the circuit thus far described, the output of the rotor 38 of the synchro transformer 37 is connected between the grids 55 and 56 of the thyratron tubes 41 and 42. The phase of the connections is such that if the load shaft leads or lags the reference shaft by more than a desired amount, the rotor 38 will have a voltage thereacross sufficient to change the relative current flow through the thyratron tubes 41 and 42 and the fields 19 and 20 so as to change the drive of the load shaft to obtain the desired lead or lag between the load shaft 10 and the reference shaft 11.

An arrangement as thus far described was found to have a very fast response but had a tendency to be unstable. To test for stability, the control loop was opened, for example, by removing the drive connection between load shaft 10 and rotor 29 of the synchro generator 28. A variable frequency input was then applied at the synchro generator 28 with the output at the differential gearing 17 being measured. Plotting the output-input relation vectorially with variable frequency, a curve as indicated by reference numeral 68 in Figure 3 was obtained, the frequency increasing in the direction of arrow 69, point 70 being at a relatively low frequency with point 71 being at a relatively high frequency. This curve was obtained without a 180° phase shift normally present in the control loop. Hence, at an intermediate frequency such as the point 72 on the real axis, the output is in phase with the input and, when the loop is closed, regeneration takes place. As shown, the point 72 is to the left of the —1,j0 point and since the plot is of output versus input, the loop is oscillatory and unstable at the frequency of point 72.

The stabilization means of this invention is operable on the control amplifier 24 over an intermediate range of frequencies including the frequency of point 72 for introducing a negative feed back to render the control loop non-oscillatory and stable.

The stabilization means of this invention, in a preferred form, includes a small direct-current generator or tachometer 74 mechanically driven by the load shaft 10 and electrically connected to terminals 75 and 76 of the control amplifier 24. As shown in Figure 2, a pair of resistors 77 and 78 and a capacitor 79 are connected in series between the terminals 75 and 76.

When the load shaft 10 and the tachometer 74 are operated at a constant speed, the capacitor 79 will be substantially completely charged up through the resistors 77 and 78 and there will be substantially no voltage drop across the resistors. When, however, there is a sudden change in speed of the load shaft 10 and tachometer 74, the sudden change in voltage will appear across the resistors 77 and 78. This voltage is herein operative over an intermediate range of frequencies including the frequency of point 72, Figure 3, to reduce the output of the control amplifier. Hence, this stabilization means provides a negative feed back.

To accomplish this negative feed back, the resistors 77 and 78 are herein in the form of potentiometers having movable contacts 81 and 82, respectively, which are connected to grids 83 and 84 of control tubes 85 and 86, respectively. The junction between the potentiometers 77 and 78 is connected to a terminal 87 which is, in turn, connected to the negative side of a source of direct-current. A terminal 88 is raised to be connected to the positive side of the source of direct-current and is connected through windings 89 and 90 to plates 91 and 92 of the tubes 85 and 86, respectively. These windings 89 and 90 control the saturation of reactors 93 and 94 respectively which have windings 95 and 96, respectively, the reactance of which is varied by varying the direct-current flow through the control windings 89 and 90.

The tubes 85 and 86 are cathode biased with cathode resistors 97 and 98 and by-pass condensers 99 and 100. Grid-leak resistors 101 and 102 and screen resistors 103 and 104 are also provided for the tubes 85 and 86, respectively.

Thus, when there is any sudden change in speed of the load shaft 10 and of the tachometer 74, currents will flow in the potentiometers 77 and 78 to provide voltages at movable taps 81 and 82 of opposite polarity with respect to the common terminal 87. These voltages are applied to the grids 83 and 84 of the tubes 85 and 86, respectively, and will change the current flow through the windings 89 and 90 in opposite respects. This will result in corresponding opposite changes in the reactance of windings 95 and 96. These opposite changes in the reactances are used to provide negative feed back in the control amplifier and to stabilize the same. For this purpose, a transformer 105 is provided which has a primary winding 106 connected at one side to the line terminal 46 and at the other side through the master switch 47 to the line terminal 45. The transformer 105 also has a pair of secondary windings 107 and 108. A pair of resistors 109 and 110 are connected across the winding 107 with a resistor 111 connected in series with the reactance winding 95 across the secondary 107. The junction between the resistors 109 and 110 and the junction between the resistor 111 and the reactance 95 are connected to opposite ends of the potentiometer 61.

Normally, with substantially constant speed of the load shaft 10 and of the tachometer 74, the grid voltage of the tube 85 is constant, the reactance of the winding 95 is constant and the bridge including resistors 109, 110 and 111 and the winding 95 is such that there is very little current through the potentiometer 61. When, however, there is a sudden change in speed of the load shaft, a voltage will be induced in the potentiometer 77, the grid voltage of the tube 85 will be changed, the reactance of the winding 95 will be changed and an alternating voltage will appear between the movable contact 62 and the one end of the potentiometer 61 connected to the resistor 60 so that this voltage will change the grid voltage of the thyratron 42 and the current conducted therethrough.

The variable reactance winding 96 is connected in a similar fashion in series with a resistor 112 across the winding 108 with a pair of resistors 113 and 114 also connected across the winding 108. The junction between the resistors 113 and 114 and the junction between the resistor 112 and the variable reactance winding 96 are connected to the potentiometer 59 so that a voltage change in the grid circuit of the thyratron tube 41 will be reflected from any change in the reactance of the winding 96 caused by changes in the speed of the load shaft 10.

As pointed out above, the resistor capacitor combination including the potentiometers 77 and 78 and the capacitor 79 is operative only over an intermediate range of frequencies which should, of course, include the frequency of the point 72 where oscillation is likely to occur. The phasing of the circuits between the potentiometers 77 and 78 and the grids 55 and 56 of the tubes 41 and 42, respectively, is such that over this intermediate range of frequencies, the feed back is negative so that regeneration is limited and the control apparatus is stabilized.

This is illustrated in the graph of Figure 3 in which curve 115 is a plot of the output-input ratio over a range of frequencies with the stabilization means of this invention operative. It will be noted that this curve crosses the real axis to the right of the $-1,j0$ point and hence the loop is stable.

It may be noted that the bridge circuits connected to the secondaries 107 and 108 of the transformer 105, in addition to supplying alternating voltage for the variable reactors 95 and 96, may also be adjusted to provide a proper bias voltage for the thyratrons 41 and 42 and hence serve a dual function and purpose. It will be also apparent that the control and stabilization apparatus of this invention may be very compact and rugged and at the same time is very efficient in operation, readily adjusted and may be easily and economically manufactured from a minimum number of component parts.

It will be understood that modifications and variations may be effected without departing from the spirit and scope of the novel concepts of the present invention.

We claim as our invention:

1. Speed control apparatus including a load shaft, drive means for said load shaft, means for controlling the drive speed of said drive means, means responsive to the speed of said load shaft for controlling said drive speed controlling means, generating means connected to said load shaft and having an electrical output which is a function of the speed of said load shaft, a circuit including a resistor and a capacitor connected in series across said output, an alternating current excited saturable reactor, means for controlling said reactor in accordance with voltage developed across said resistor in response to changes in the speed of the load shaft, and means modifying the operation of said drive speed controlling means in accordance with the alternating voltage across said saturable reactor to introduce negative feed back over a range of frequencies from a frequency greater than zero to a frequency less than infinity and to prevent oscillation in the control apparatus.

2. Speed control apparatus including a load shaft, drive means for said load shaft, means for controlling the drive speed of said drive means, means responsive to the drive speed of said load shaft for controlling said drive speed controlling means, an alternating current excited saturable reactor, means for varying the saturation of said reactor and the voltage thereacross in accordance with variations in speed of said load shaft, and means for applying said voltage to said drive speed controlling means for introducing negative feedback over a range of frequencies from a frequency greater than zero to a frequency less than infinity to prevent oscillation and to stabilize the control apparatus.

3. Speed control apparatus including a load shaft, drive means for said load shaft, a current responsive element for controlling the drive speed of said drive means, means for controlling current flow through said current responsive elements, means responsive to the speed of said load shaft for controlling said current controlling means, generating means connected to said load shaft and having an electrical output which is a function of the speed of said load shaft, a circuit including a resistor and a capacitor in series across said output, an alternating current excited saturable reactor, means for controlling the saturation of said reactor in accordance with voltages developed across said resistor in response to changes in speed of said load shaft, and means modifying the operation of said drive speed controlling means in accordance with the alternating voltage across said saturable reactor.

4. Speed control apparatus including a load shaft, drive means for said load shaft, a current responsive element for controlling the drive speed of said drive means, means for controlling current flow through said current responsive element, means responsive to the speed of said load shaft for controlling said current controlling means, an alternating current excited saturable reactor, means for varying the saturation of said reactor and the voltage thereacross in accordance with variations in speed of said load shaft, and means for applying said voltage to said current controlling means to introduce negative feedback over a range of frequencies from a frequency greater than zero to a frequency less than infinity and to prevent oscillation and stabilize the control apparatus.

5. Speed control apparatus comprising: a load shaft, drive means for said load shaft, a current responsive element for controlling the drive speed of said drive means, an alternating current excited gas-filled electronic tube for controlling current flow through said current responsive element and having a control electrode, means responsive to the speed of said load shaft and connected to said control electrode, generating means connected to said load shaft and having an electrical output which is a function of the speed of said load shaft, a circuit including a resistor and a capacitor in series across said output, an alternating current excited saturable reactor, means for controlling said reactor in accordance with voltage developed across said resistor in response to changes in speed of said load shaft, and means for applying the alternating voltage developed across said saturable reactor to said control electrode to introduce negative feedback and prevent oscillation.

6. Speed control apparatus comprising: a load shaft, drive means for said load shaft, a current responsive element for controlling the drive speed of said drive means, an alternating current excited gas-filled electronic tube for controlling current flow through said current responsive element and having a controlling electrode, means responsive to the speed of said load shaft and connected to said control electrode, an alternating current excited saturable reactor, means for varying the saturation of said reactor and the voltage thereacross in accordance with variations in speed of said load shaft, and means for applying said voltage to said control electrode to introduce negative feed back and to stabilize the control apparatus.

7. Speed control apparatus including a load shaft, drive means for said load shaft, means for controlling the drive speed of said drive means, a synchro generator and a synchro transformer having stators connected together and rotors driven at a reference speed and by said load shaft, one rotor being excited by alternating current and the other being connected to said control electrodes, generating means connected to said load shaft and having an electrical output which is a function of the speed of said load shaft, a circuit including a resistor and a capacitor in series across said output, an alternating current excited saturable reactor, means for controlling said reactor in accordance with voltage developed across said resistor in response to changes in speed of the load shaft, and means modifying the operation of said drive speed controlling means in accordance with the alternating voltage across said saturable reactor.

8. Speed control apparatus comprising: a load shaft, drive means for said load shaft, means for controlling the drive speed of said drive means, a synchro generator and a synchro transformer having stators connected together and rotors driven by said load shaft and at a reference speed, one rotor being excited by alternating current and the other being connected to control said drive speed controlling means, an alternating current excited saturable reactor, means for varying the saturation of said reactor and the voltage thereacross in accordance with variations in speed of said load shaft, and means for applying said voltage to said drive speed controlling means to introduce negative feed back over a range of frequencies from a frequency greater than zero to a frequency less than infinity and to prevent oscillation and stabilize the control apparatus.

9. Speed control apparatus comprising: a load shaft, drive means for said load shaft, a pair of current responsive elements for controlling said drive means, the speed of the load shaft being a function of the current through one of said elements and an inverse function of the current through the other of said elements, a pair of alternating current excited electronic tubes for controlling current control through said current responsive elements and each having a control electrode, means responsive to the speed of said load shaft and connected to said control electrodes, generating means connected to said load shaft and having an electrical output which is a function of the speed of said load shaft, the circuit including a resistor and a capacitor in series across said output, an alternating current excited saturable reactor, means for controlling said reactor in accordance with voltages developed across said resistor in response to changes in speed of said load shaft, and means applying alternating voltages developed across said saturable reactor to said control electrodes for introducing negative feed back to prevent oscillation and stabilize the control apparatus.

10. Speed control apparatus comprising: a load shaft, drive means for said load shaft, a pair of current responsive elements for controlling said drive means, the speed of the load shaft being a function of the current through one of said elements and inverse function of the current through the other, a pair of alternating current excited gas-filled electronic tubes for controlling current flow through said current responsive elements and each having a control electrode, means responsive to the speed of said load shaft and connected to said control electrodes, an alternating current excited saturable reactor, means for varying the saturation of said reactor and the voltage thereacross in accordance with variations in speed of said load shaft, and means for applying said voltage to said control electrodes to introduce negative feed back and to prevent oscillation and stabilize the control apparatus.

11. Speed control apparatus including a load shaft, drive means for said load shaft, a current responsive element for controlling said drive means, an alternating current excited gas-filled electronic tube for controlling current flow through said current responsive element and having a control electrode, a synchro generator and a synchro transformer having stators connected together and rotors driven at a reference speed and by said load shaft, one rotor being excited by alternating current and the other rotor being connected to said control electrodes, an alternating current excited saturable reactor, means for varying the saturation of said reactor and the voltage thereacross in accordance with variations in speed of said load shaft, and means for applying said voltage to said control electrode for introducing negative feed back to prevent oscillation and stabilize the control apparatus.

12. Speed control apparatus comprising: a load shaft, drive means for said load shaft, a pair of current responsive elements for controlling said drive means, the speed of said load shaft being a function of the current through one of said elements and an inverse function of the current through the other of said elements, a pair of alternating current excited gas-filled electronic tubes for controlling current flow through said current responsive elements and each having a control electrode, a synchro generator and a synchro transformer having stators connected together and rotors driven at a reference speed and by said load shaft, one rotor being excited by alternating current and the other rotor being connected to said control electrodes, generating means connected to said load shaft and having an electrical output which is a function of the speed of said load shaft, a circuit including a resistor and a capacitor in series across said output, an alternating current excited saturable reactor, means for controlling said reactor in accordance with voltages developed across said resistors in response to changes in speed of the load shaft, and means applying the alternating voltages developed across said saturable reactor to said control electrodes.

References Cited in the file of this patent

UNITED STATES PATENTS

| | | |
|---|---|---|
| 1,617,991 | Dowey | Feb. 15, 1927 |
| 2,115,086 | Riggs | Apr. 26, 1938 |
| 2,131,759 | Satterlee | Oct. 4, 1938 |
| 2,411,745 | Moyer | Nov. 26, 1946 |
| 2,550,514 | Alexanderson | Apr. 24, 1951 |